Nov. 8, 1949     D. L. EBERT ET AL     2,487,769
FILTER
Filed Dec. 6, 1944     4 Sheets-Sheet 1
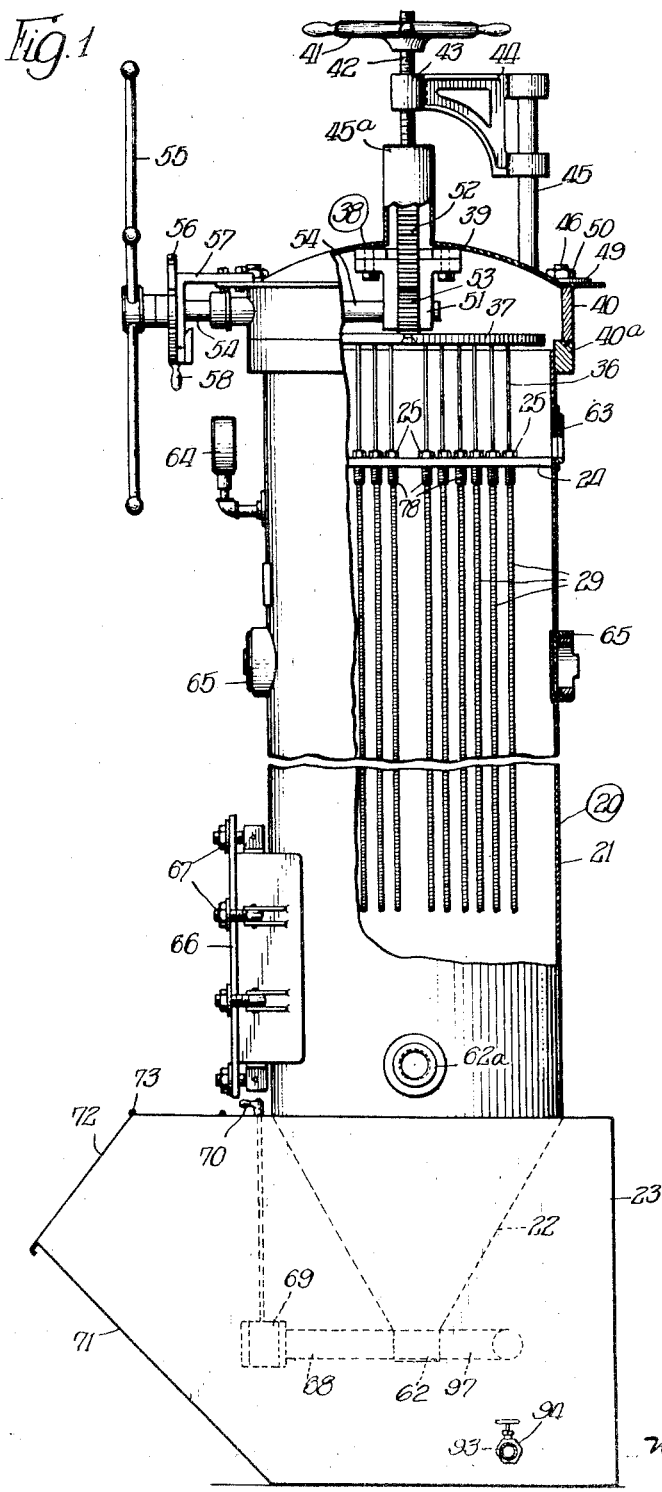
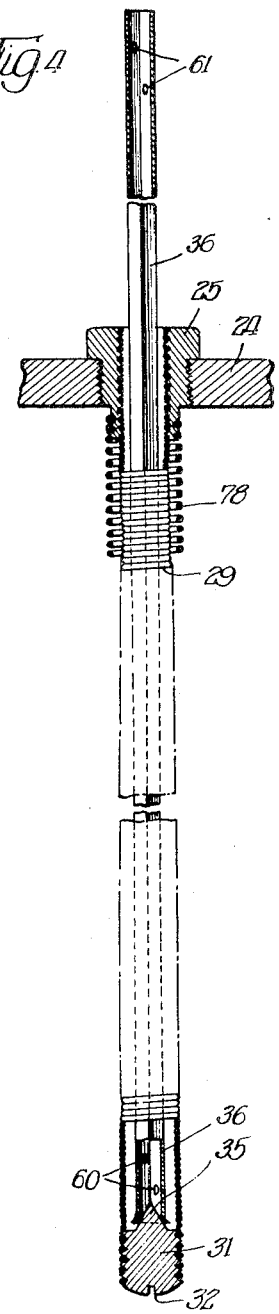
INVENTORS
Dwight L. Ebert,
BY George E. Olson, Nov. 8, 1949     D. L. EBERT ET AL     2,487,769
FILTER
Filed Dec. 6, 1944     4 Sheets-Sheet 2
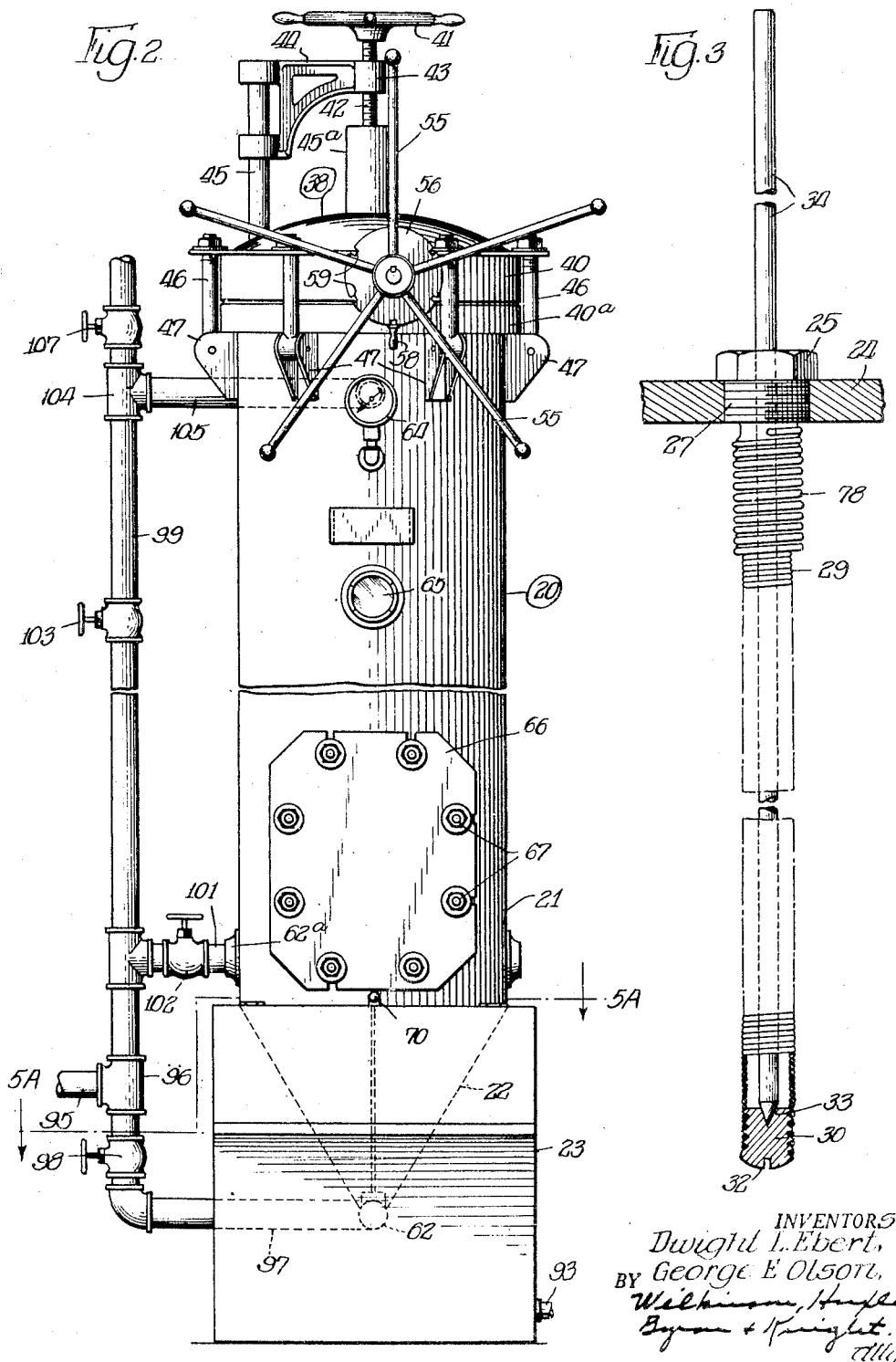
INVENTORS.
Dwight L. Ebert,
BY George E. Olson, INVENTORS.
Dwight L. Ebert,
BY George E. Olson.

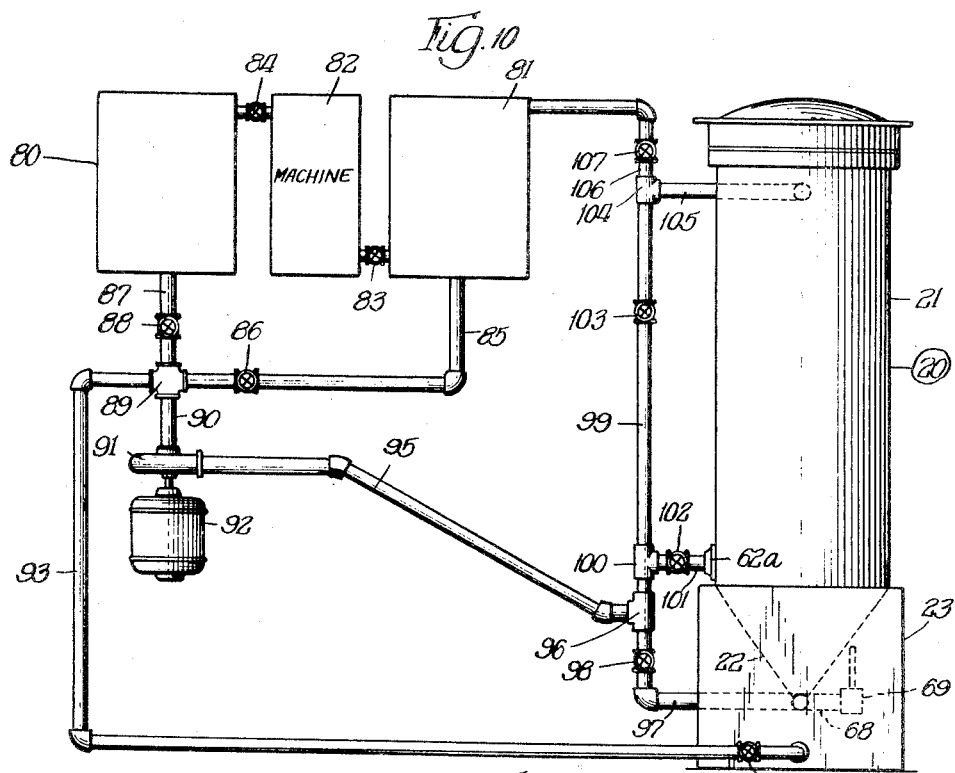
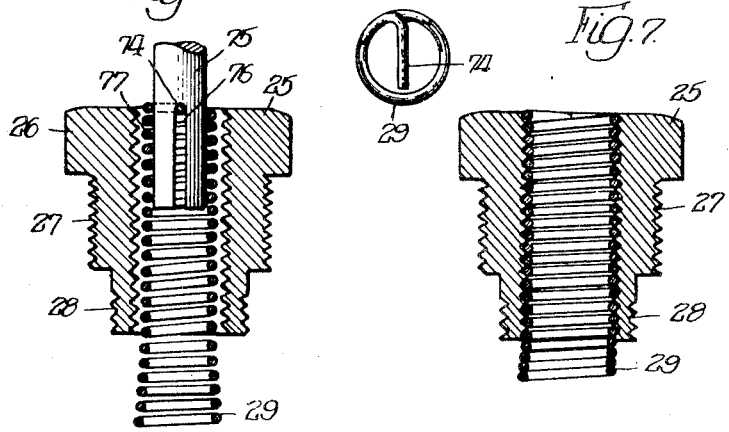

Patented Nov. 8, 1949

2,487,769

UNITED STATES PATENT OFFICE 2,487,769

FILTER

Dwight L. Ebert and George E. Olson, Chicago, Ill., assignors to Olson Filtration Engineers, Inc., Chicago, Ill., a corporation of Illinois Application December 6, 1944, Serial No. 566,844

6 Claims. (Cl. 210—184)

The present invention relates to improvements in filters.

In the operation of filters, particularly for commercial purposes, it is common practice to build up upon the filtering media a filter cake consisting of filter powder together with solids from the liquid being filtered. When the filtering media with their filter cakes of filter powder and entrained soil become clogged, the filtering media must be cleaned. Prior devices with which applicants are familiar have presented serious difficulties to the cleaning operation. For example, prior devices have presented one or more of the following difficulties: In cleaning, valuable time has been lost, clean liquid has been wasted in the cleaning operation, filter powder has been used up uneconomically, and other difficulties have been encountered.

An object of the present invention is to provide an improved filter embodying springs of elongated helical form which are effective as filtering media and which may be readily cleaned.

A further object is to provide an improved filter embodying springs of elongated helical form and having means for readily adjusting said springs whereby the area of the filtering interstices may be readily and accurately adjusted.

A further object is to provide an improved filter in which the cleaning of filtering media may be accomplished in a minimum of time, with a minimum of trouble, and with a minimum of wear upon said filtering media.

A further object is to provide an efficient filter which is inexpensive to build, effective in operation, and not likely to get out of order.

A further object is to provide an improved filter made up of simple parts.

A further object is to provide an improved filter which is economical of filter powder.

A further object is to provide an improved filter structure embodying elongated helical springs in which said springs may be readily assembled and disassembled and in which said springs will not come loose in service.

A further object is to provide an improved filter well adapted to meet the needs of commercial service.

Further objects will appear as the description proceeds.

Referring to the drawings—

Figure 1 is a view in side elevation, parts being broken away, illustrating one embodiment of the present invention;

Figure 2 is a view in front elevation of the structure shown in Figure 1;

Figure 3 is a view on an enlarged scale of a filtering unit which may be used in the embodiment of the invention illustrated in Figures 1 and 2;

Figure 4 is a view similar to Figure 3 but showing a slightly modified construction;

Figure 7 is a view of a bushing forming part of the illustrated embodiment of the present invention having a helical spring mounted therein;

Figure 8 is an end view of a helical spring;

Figure 9 is a view illustrating, in an exaggerated fashion, how the helical spring may be assembled in or disassembled from its cooperating plug; and Figure 10 is a layout illustrating how the filter may be connected in circuit.

Figure 5:
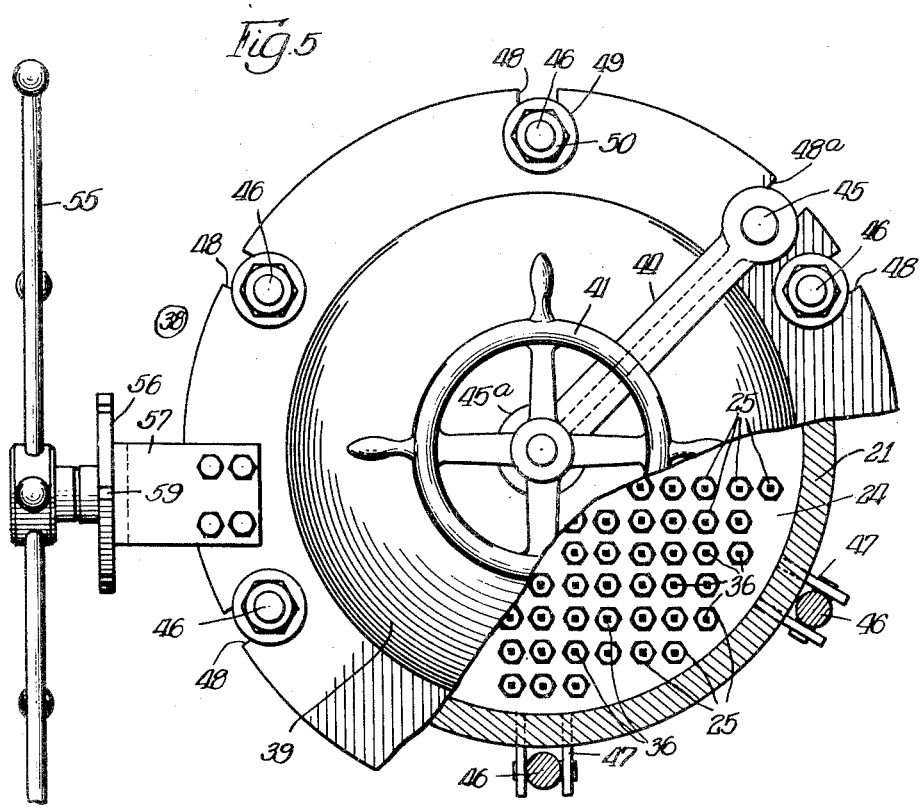
Figure 5 is a top plan view, on an enlarged scale, of the construction illustrated in Figures 1 and 2, parts being broken away.
Figure 5A:
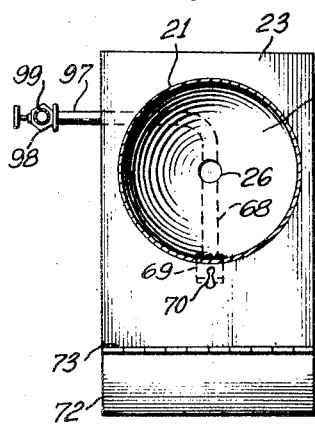
Figure 5A is a sectional view taken along the planes indicated by the lines 5A—5A of Figure 2.
Figure 6:
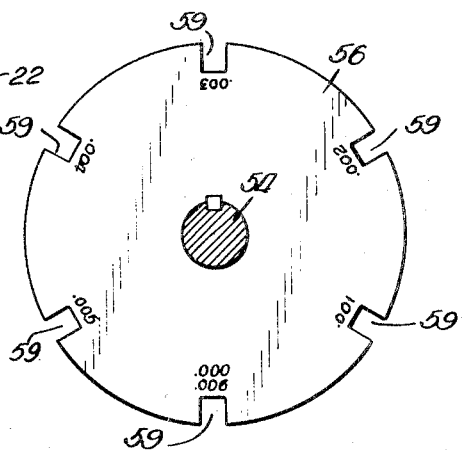
Figure 6 is a view on an enlarged scale of an indicator dial shown in the assembly of Figure 2.

Referring first to Figures 1 and 2, a filter embodying the principles of the present invention is indicated as a whole by the numeral 20. Said filter includes an elongated cylindrical shell 21 having a conical bottom 22, said bottom being mounted in a sludge compartment 23. Adjacent to the top of the cylindrical shell 21 is the diaphragm 24 having a liquid-tight fit with said shell 21. Said diaphragm is provided with a number of spaced perforations, each provided with a bushing 25. Each of said bushings, as shown in Figures 7 and 9, is provided with a head portion 26. Below said head 26 is the externally screw-threaded shank portion 27, and below said screw-threaded shank portion 27 is the externally screw-threaded shank portion 28 of lesser diameter than the shank portion 27. Each of said bushings is internally threaded for the reception of an elongated helical spring 29—that is, springs the coils of which are arranged like the thread of a screw.

Said springs 29—29 extend downwardly in pendant positions from the diaphragm 24. The lower extremities of said springs should be in the same plane. The lower extremity of each of said springs is closed by a plug, indicated in Figure 3 by the numeral 30 and indicated in Figure 4 by the numeral 31. Each of said plugs is provided with a screw driver slot 32.

Means are contemplated according to the present invention for extending the springs 29—29 to adjust the interstices between the coils of said springs; that is, each spring is placed under tension to provide it with a helical opening permitting the passage of liquid to be filtered. According to the disclosure of Figure 3, the plug 30 is provided on its upper side with a conical recess 33 for receiving the pointed lower end of a rod 34. According to the disclosure of Figure 4, the plug 31 is provided with the upstanding conical portion 35 adapted to receive the lower extremity of a tube 36.

The rods 34 or the tubes 36 in the assembly of springs 29—29 should be of equal length. Engaging the tops of said rods 34 or tubes 36 is the adjustment control plate 37. Inasmuch as the diaphragm 24 is fixed, it will be understood that the length of the springs and consequently the size of the interstices, that is—the helical opening between the coils thereof, may be adjusted by moving the adjustment control plate 37.

The means for adjusting the vertical position of the plate 37 are embodied in a cover assembly, indicated as a whole by the numeral 38. Said assembly 38 includes the domed cover plate 39, which has secured thereto the dependent ring 40 having a tongue and groove engagement with a reinforcing ring 40a secured to the top of the cylindrical stationary shell 21. Said cover plate 39 with its dependent ring 40 may be raised and lowered by means of a hand wheel 41 fast with a screw 42 adapted to turn in the nut portion 43 of a swinging arm 44. Said swinging arm 44 is adapted to swing upon the upstanding shaft 45 which is fast with the cylindrical shell 21. The lower extremity of said screw 42 may have rotatable abutting engagement with collar means (not illustrated) in the upwardly extending portion 45a of the cover plate 39, whereby turning movement of the hand wheel 41 will communicate a lifting or lowering movement to the cover assembly 38.

The cover plate 39 is adapted to be securely held in place by a plurality of bolts 46—46, which bolts are swingingly carried within brackets 47—47 fast with the shell 21. As shown in Figure 5, said bolts 46 are adapted to be located within notches 48 in the periphery of the cover plate 39, washers 49 and nuts 50 being provided for the several bolts 46 to hold the cover plate 39 securely in place.

After the bolts 46 have been swung away from the cover plate 39, said cover plate may be raised by turning the hand wheel 41, which in cooperation with the nut portion 43 of the arm 44 will communicate a vertical movement to said cover plate 39. After the tongue in the ring 40 has been freed from the groove in the reinforcing ring 40a the entire cover plate assembly may be swung about the axis of the shaft 45, which shaft may be located within a notch 48a in the cover plate 39 to hold the cover assembly 38 against rotation.

Forming part of the cover plate assembly 38 is the adjustment control plate 37 and the operating means therefor. Disposed on the under side of the cover plate 39 is a bracket 51, which supports a gear rack 52 for movement upwardly and downwardly as the parts are viewed in Figure 1. Mounted for cooperation with the rack 52 is the pinion 53 secured to the shaft 54 adapted to be turned by the stretcher hand wheel 55. Fast with the shaft 54 is the indicator dial 56. Extending outwardly from the periphery of the cover plate 39 is a bracket 57, which provides, together with the bracket 51 above mentioned, bearings for the shaft 54. The numeral 58 indicates an indicator lock. Said indicator lock is adapted to be located within any one of a plurality of notches 59 preferably equally spaced around the periphery of the dial 56. When the indicator lock 58 is in the position illustrated in Figure 1 said lock will be located within one of the notches 59 and will hold the dial 56 and consequently the shaft 54 against rotation. To unlock the dial 56 the indicator lock 58 will be swung out of engagement with the dial 56, after which the hand wheel 55 may be turned to rotate the shaft 54 and consequently the pinion 53 to provide a vertical movement for the rack 52. The rack 52 has its lower extremity secured to the adjustment control plate 37, and consequently the rotation of the hand wheel 55 will result in vertical movement of the adjustment control plate 37. The indicator lock 58 should preferably be of the type which will stay in a position to which it is moved, so that when in unlocked position it will permit free rotation of the hand wheel 55 and when in locked position it will securely hold the hand wheel 55 against rotation whereby the adjustment control plate 37 will be held stationary.

The adjustment control plate 37 is positioned to abut against the upper extremities of the rods 34 or tubes 36, whichever are used in the assembly. Said rods 34 or tubes 36 should extend above the tops of the bushings 25 a sufficient distance to permit full range of movement in a vertical direction of the adjustment control plate 37. According to the illustrated embodiment of the present invention this full range of vertical movement of the plate 37 will correspond with one complete revolution of the hand wheel 55 and the dial 56. In the illustrated embodiment of the invention there are six notches 59 in the dial 56. The spacing between two adjacent notches 59 in said embodiment corresponds to an extension of one thousandth of an inch in the spacing between coils of the springs 29—29. According to said embodiment the notches will be marked as follows:

$$\frac{.000}{.006}$$

.001; .002; .003; .004; .005. According to said preferred embodiment, when the hand wheel is in a position such that the indicator lock 58 engages in the notch marked $$\frac{.000}{.006}$$

the coils of the spring will be (1) substantially closed, or (2) spaced apart .006 inch, depending upon whether the hand wheel is at one extremity or the other of its full circle of movement. The spacing for the passage of liquid to be filtered will be indicated by the marking at the notch which is occupied by the indicator lock 58. In other words, after the indicator lock 58 has been moved to unlocking position the hand wheel 55 may be swung through a complete revolution to position the adjustment control plate 37 vertically throughout a range from .000 inch to .006 inch. For further convenience in said preferred embodiment the spacing between notches corresponds to one inch extension in the springs 29—29. It will be understood, of course, that the markings and dimensions indicated are purely arbitrary and may be varied to suit the requirements of the user.

The rod 34 illustrated in Figure 2 is a simple and inexpensive means for adjusting the length of the corresponding spring 29.

The tube 36 illustrated in Figure 4 is slightly more expensive, but has the advantage that it provides a second path for the flow of filtered liquid, particularly from the bottom portion of the spring. As shown in Figure 4, the tube 36 is provided with a plurality of holes 60 permitting the passage of liquid from the exterior of the corresponding tube to the interior thereof. Said tube is provided adjacent to its top with holes 61—61 to permit the passage of liquid from the interior of the tube 36 to the space above the diaphragm 24 within the shell 21.

Located at the bottom of the cone 22 is the inlet fitting 62, and located adjacent to the bottom of the cylindrical shell 21 (that is—adjacent to the top of the cone 22) is the inlet fitting 62a. Located above the diaphragm 24 is the outlet fitting 63 from which filtered liquid may be discharged from the filter. The numeral 64 indicates a pressure gauge. Peep holes 65 may be provided through which an inspection may be had of the liquid within the cylindrical casing 21 for the purpose of determining, for example, when the liquid has become clear. Likewise, when the filter is drained the springs 29 may be inspected through these peep holes.

Located adjacent to the bottom of the cylindrical shell 21 is the inspection door 66, which may be held in place by means of swinging bolts 67 operating similarly to the bolts 46—46 which hold the cover assembly 38 in position.

The conical bottom or cone 22 of the shell 21 is provided with an outlet pipe 68 provided with the quick opening valve 69 for discharging sludge from said bottom 22 into the sludge compartment 23. Said quick opening valve 69 may be controlled by the handle 70 located at the top of the sludge compartment 23. One side of the sludge compartment 23 is provided with the slanting wall 71. A cover 72 is swung about the axis 73. The slanting wall 71 facilitates the matter of scraping out sludge.

Referring now to the structure of the springs 29, said springs are preferably of tapering conformation, the larger diameter being located at the bottom for the reason that the larger diameter is weaker and the lesser weight operating on the lower portion of the spring is consequently less effective in opening up the interstices, that is—the helical opening, of the spring. It is preferred that each spring shall have a constant taper decreasing upwardly, resulting in a uniform spacing between the coils. In practice it will doubtless be preferred to utilize springs of a standard length (say 30 inches) for full-size filters. For smaller filters standard springs may be cut into aliquot parts, to form, for example, half lengths or third lengths of standard springs. The smaller end of each spring will preferably have a diameter too large to screw readily into its corresponding bushing 25. When a spring is cut in the middle (or at any other region), the smaller diameter of the cut-off portion will, of course, be over-size for screwing into a bushing 25. The difficulty of screwing the over-size spring into its corresponding bushing is overcome by the following expedient, illustrated in Figures 7, 8 and 9. The smaller extremity of each spring will have its end portion bent diametrically, as indicated by the numeral 74 (Fig. 8). A rod 75, with its end provided with a slot 76, is engaged over this diametrical portion and held against turning. The bushing 25 is disposed around this rod, and the coil spring is twisted so that the end of the spring held against turning will be reduced in diameter, as indicated in exaggerated form in Figure 9 by the numeral 77. The spring is then allowed to expand and will seat itself firmly within the internal screwthreads of the bushing. After a spring has been inserted into its corresponding bushing, the diametrical portion 74 is removed, so that it will not present an obstruction to the entry of the corresponding rod 34 or tube 36. The engagement of the over-size spring within the bushing 25 is so effective that no amount of vibration which will be encountered in service will cause disengagement of a spring from its bushing.

Referring to Figures 3 and 4, the numeral 78 indicates a spring sleeve. It has been found that with the coil springs 29 located in their corresponding bushings 25 (if the spring sleeve is not used), there has been difficulty due to a breakthrough in the filter cake at the region adjacent to the lower end of the bushing 25. Two reasons occur to applicants in explanation of this breakthrough: (1) If there is a swinging action of a spring (due for example to vibration caused by forces outside of the filter) there results a leverage action at this region which breaks the filter cake; and (2) the filter cake abutting the bushing has no opportunity to form a bond, thereby leaving a region of weakness permitting the break-through. Whatever the reason, the addition of the spring sleeve 78 protects the filter cake at this vulnerable region.

Said spring sleeve 78, as will be clear from Figures 3 and 4, encircles the upper portion of the corresponding elongated spring 29. Said spring sleeve 78 is threaded upon the externally threaded shank 28 of the corresponding bushing 25 (Figs. 7 and 9).

A hook-up for the filter 20 which is at present preferred is illustrated in Figure 10. A reservoir for dirty liquid is indicated by the numeral 80. A reservoir for receiving clean liquid from the filter is indicated by the numeral 81, and a machine which is to be supplied with clean liquid, such for example as coolant, is indicated by the numeral 82. Access from the clean liquid reservoir 81 to the machine 82 is controlled by the valve 83, and access from the machine 82 to the reservoir 80 for dirty liquid is indicated by the numeral 84. Leading from the clean reservoir 81 is a pipe 85 controlled by the valve 86. Leading from the reservoir 80 for dirty liquid is the pipe 87 controlled by the valve 88. Said pipes 85 and 87 lead to the union 89, from which the pipe 90 leads to the pump 91 adapted to be operated by the motor 92. Also leading from the union 89 is the pipe 93, which leads to a region adjacent to the bottom sludge compartment 23. Said pipe 93 is controlled by the valve 94. Leading from the pump 91 is the pipe 95, which leads to the union 96. Connected with said union 96 is the pipe 97 controlled by the valve 98, which pipe 97 leads to the fitting 62 at the bottom of the cone 22. Also connected to the union 96 is the pipe 99 provided with the union 100, from which a pipe 101 leads to the region spaced slightly above the top of the cone 22. Said pipe 101 is connected with the fitting 62a and is provided with the valve 102. Above the union 100 the pipe 99 is provided with the valve 103, and above said valve 103 said pipe 99 connects with the union 104, from which a pipe 105 leads to the top of the filter 20 at the region above the diaphragm 24, said pipe 105 being connected to the fitting 63 (Fig. 1). Also leading from said fitting 104 is the pipe 106 controlled by the valve 107. Said pipe 106 is adapted to conduct filtered liquid from the filter 20 a point of use or storage, as for example to the reservoir 81 for clean liquid.

A mode of operation of the above described embodiment of the present invention is substantially as follows:

The springs 29 will be extended to the desired extent by operation of the hand wheel 55, which controls the elevation of the adjustment control plate 37. As indicated above, the indicator dial 56 is provided with a plurality of notches in its periphery, which notches are adapted to be engaged selectably by the indicator lock 58. For convenience, the movement of the indicator dial from one notch to the next may correspond to approximately one one-thousandth (1/1000) inch extension of the interstices of the springs. According to the illustrated embodiment of the present invention the interstices may be varied from practically zero up to six one-thousandths (6/1000) inch. It will be understood, of course, that the figures chosen are for purposes of illustration only, and that the variation of the interstices, that is—the helical opening, may be made within other limits.

It will probably be preferred to provide the springs 29 with a precoat of filter powder, and for this purpose clean liquid from the reservoir 81 may be passed through the pipe 85 to the pump 91, whence it may be delivered through the pipe 95, valve 98 and pipe 97 to the bottom of the cone 22. Filter powder will be added to the liquid before it reaches the pump 91. The adjustment control plate 37 will have been positioned by manipulation of the hand wheel 55 and will have been locked in position by the indicator lock 58 to provide the dimension of interstices in said springs 29. After a short period of operation a precoat will have been built up upon the springs 29 and the springs will be conditioned for normal filtering operation.

Dirty liquid will be passed from the reservoir 80 to the pump 91, whence it may be passed through the pipe 95, through the valve 98 and pipe 97 to the bottom of the cone 22. A filter cake intermingled with dirt builds up upon the precoat on the various springs. Of course, the springs must be spaced apart a sufficient distance to permit the building up of the filter cake on the various springs. The filtered liquid passes into the interiors of the springs 29, from which regions it passes into the space above the diaphragm 24, whence it is discharged through the fitting 63, pipe 105 and valve 107 to a point of disposal, as for example the clean reservoir 81.

When it is desired to clean the coiled springs, the flow of liquid to the filter is stopped by closing the valve 98 and by stopping the pump 91. The hand wheel 55 is turned (the indicator lock 58 having been released) to move the adjustment control plate down, exerting pressure upon the upper extremities of the rods 34 or the tubes 36 (whichever are in use). The springs will accordingly be extended to increase the dimensions of the interstices in said springs. This action breaks the filter cake, and in many instances the filter cake drops off into the cone 22. In other cases the hand wheel 55 is turned to move the adjustment control plate to its topmost position, in which case each spring 29 is shortened to substantially a closed cylinder, causing the filter cake to slide or ooze downwardly from each of the springs. If the operator desires, he may extend and release the spring several times to insure the release of all of the filter cake, which will gravitate into the cone 22.

In the unexpected event that manipulation of the hand wheel 55, above described, does not completely remove the filter cake from the springs 29, the filter may be backwashed. This may be necessary at times if the dirty liquid being filtered is filled with lint or the like.

To accomplish backwashing, the valve 98 is closed, valve 103 is opened, valve 107 is closed, and the valve 69 (operated by the handle 70) is opened. If dirty liquid is to be used in backwashing, the valve 88 is opened. If clean liquid is to be used for backwashing, the valve 86 is opened. The pump 91 will force liquid through the pipe 95, pipe 99, valve 103 and pipe 105 into the space above the diaphragm 24 down into the interiors of the springs 29 through the interstices of said springs into the cone 22 and through the valve 69 into the sludge compartment 23.

The sludge in the sludge compartment 23 can be removed by means of a scraper or hoe through the door 72. The liquid from the sludge compartment can be pumped into the filter through the valve 94 through the pipe 93, union 89, pump 91, pipe 95, valve 98 and pipe 97 to the bottom of the cone 22.

Another use for the sludge compartment 23 is to operate as a slurry tank, or mixing tank, for filter aid. When the filter is allowed to stand for any extended length of time, such as over night, or between shifts, the filter cake is apt to fall off the springs 29 either in whole or in part.

According to the present invention the filter cake deposited in the cone 22 can be used over again if it has not been spent. This filter cake in the cone 22 may be stirred up by delivering liquid under pressure from the pump 91 through the valve 98 and pipe 97 to the bottom of the cone 22. The filter powder in stirred up condition will thereby be redeposited upon the springs 29.

If, however, the filter powder in the filter cake deposited in the cone 22 has been spent and should be discharged, liquid under pressure may be admitted through the valve 102 to the region adjacent to the top of the cone 22. The valve 69 will be opened whereby the sludge from the cone 22 will be discharged into the sludge compartment 23. When too much liquid is discharged with the sludge, the valve 69 will be closed.

It will be clear, therefore, that solids can be removed from the cone 22 while the filter is working, thus eliminating "down time" for filter cleaning.

It will be noted that the flow of liquid in the normal filtering operation is from the bottom of the filter upwardly. After a filtering operation has been finished, as for example when the plant shuts down for the night, the precoat on the springs 29—29 will have a tendency to gravitate to the cone 22. When operations are again started, the upward movement of the liquid to be filtered with the filter cake mixed therewith will envelop the springs 29, again depositing a filter coat upon the springs 29, whereby the springs 29 and their filter coats will perform their normal functions. This advantage is to be distinguished from the functions of other types of filters wherein the movement of the liquid to be filtered is downward. In such filters, after a shut-down the filter coat has a tendency to gravitate to the bottom and can be recovered only with considerable difficulty, in no wise comparable to the simple matter of restarting operations, as above described. In most types of filter with which applicants are familiar, if an attempt were made to simply reverse the direction of flow of liquid to be filtered the filtering members would become so clogged that they would soon be useless. In other words, the present invention presents the practical advantage that there is a tremendous saving in the amount of filter powder which need be used in the filtering process.

The filter according to the present invention has the further practical advantage that the cover assembly 38 can be readily lifted and swung about the axis of the rod 45 to a region clear of the shell 21, thereby permitting ready access to the bushings 25 which support the springs 29 and to the rods 34 or tubes 36 in said springs. Both the hand wheel 41 and the hand wheel 55 and their associated parts are in the cover assembly 38. Therefore, in the process of assembling or disassembling the springs 29—29 or the rods 34 or tubes 36, no interference will be had with any part of the cover assembly 38.

A further advantage of the present invention is that the variable stretch of the springs 29 can be set for any condition. The spacings of the coils, that is—the dimensions of the helical openings, can be set in an instant to suit the material of the liquid to be filtered.

Though a preferred embodiment of the present invention has been described in detail, many modifications will occur to those skilled in the art. It is intended to cover all such modifications that fall within the scope of the appended claims.

What is claimed is—

1. In a filter, in combination, a filter casing having an inlet and an outlet, a diaphragm in said casing between said inlet and said outlet, an opening in said diaphragm, a bushing extending through said opening, a helical spring carried by said bushing and extending from one side of said diaphragm, the interior of said spring having access to the region on the other side of said diaphragm, the other end of said spring being closed, and means controlling by definite graduated movements the distance between the ends of said spring to control the helical opening between the coils thereof, said bushing having a sleeve surrounding the junction between said spring and said bushing, said bushing, said spring and said sleeve being insertable into said diaphragm from said other side of said diaphragm.

2. In a filter, in combination, a filter casing having an inlet and an outlet, a diaphragm in said casing between said inlet and said outlet, an opening in said diaphragm, and a helical spring extending downwardly from said diaphragm, the interior of said spring having access to the region on the other side of said diaphragm through said spring, said diaphragm lying in a substantially horizontal position in ordinary use of said filter, said spring having a gradually increasing diameter downwardly from said diaphragm, the lower extremity of said spring being closed.

3. A spring unit comprising, in combination, a bushing adapted to be mounted within a diaphragm, said bushing having a head portion, a shank portion, said shank portion being externally threaded for engagement with a helical spring sleeve, a helical spring sleeve mounted upon said portion, said bushing having an axial threaded aperture and an elongated helical spring having one of its end portions engaging with the threads of said aperture, the other end portion being closed.

4. A spring unit comprising, in combination, a bushing adapted to be mounted within a diaphragm, said bushing having a head portion, a shank portion, said shank portion being externally threaded for engagement with a helical spring sleeve, a helical spring sleeve mounted upon said portion, said bushing having an axial threaded aperture and an elongated helical spring engaging with the threads of said aperture, stop means for closing the outer extremity of said helical spring, and elongated means within said helical spring engaging said stop means and extending beyond said bushing for controlling the length of said spring to control the size of the helical interstice of said helical spring.

5. In a filter, in combination, a shell, a diaphragm within said shell, said diaphragm having a plurality of spaced apertures, a plurality of filter springs having end portions disposed within said apertures having their other end portions closed, said springs being insertable into said apertures from one side of said diaphragm, a plurality of elongated members adapted to operate against the closed end portions of said filter springs, a cover assembly for said shell adapted to be secured to said shell, said cover assembly being provided with an adjustment control member adapted to operate against said elongated members to control the extension of said filter springs, and means forming part of said cover assembly for positioning said adjustment control member.

6. In a filter, in combination, a shell, a diaphragm within said shell, said diaphragm having a plurality of spaced apertures, a plurality of filter springs having end portions disposed within said apertures having their other end portions closed, said springs being insertable into said apertures from one side of said diaphragm, a plurality of elongated members adapted to operate against the closed end portions of said filter springs, a cover assembly for said shell adapted to be secured to said shell, said cover assembly being provided with an adjustment control member adapted to operate against said elongated members to control the extension of said filter springs, means forming part of said cover assembly for positioning said adjustment control member, and means for releasably holding said adjustment control member in adjusted position.

DWIGHT L. EBERT.
GEORGE E. OLSON.

REFERENCES CITED

The following references are of record in the file of this patent:

UNITED STATES PATENTS

| Number | Name | Date |
|---|---|---|
| 408,487 | Jewell | Aug. 6, 1889 |
| 1,005,780 | Raber | Oct. 10, 1911 |
| 1,716,961 | Hoffman | June 11, 1929 |
| 1,812,773 | Cannon | June 30, 1931 |
| 1,904,759 | Hueber | Apr. 18, 1933 |
| 1,958,503 | Wintzer | May 15, 1934 |
| 2,068,282 | Strindberg | Jan. 19, 1937 |
| 2,190,965 | Wood | Feb. 20, 1940 |
| 2,197,971 | Elze et al. | Apr. 23, 1940 |
| 2,301,430 | Malanowski | Nov. 10, 1942 |
| 2,308,865 | Davis | Jan. 19, 1943 |
| 2,347,927 | Peterson et al. | May 2, 1944 |
| 2,399,887 | Olson | May 7, 1946 |

FOREIGN PATENTS

| Number | Country | Date |
|---|---|---|
| 10,814 | Great Britain | AD 1884 |
| 1,180 | Great Britain | AD 1901 |
| 7,616 | Great Britain | AD 1906 |
| 636,693 | France | Jan. 14, 1928 |
| 39,483 | France | Aug. 11, 1931 |
| | (1st addition to 693,614) | |
| 797,787 | France | Feb. 24, 1936 |
| 502,103 | Great Britain | Mar. 10, 1939 |
| 527,259 | Great Britain | Oct. 4, 1940 |